F. PRIOR.
BEET HARVESTING MACHINE.
APPLICATION FILED NOV. 20, 1916.
1,281,066.
Patented Oct. 8, 1918.
2 SHEETS—SHEET 1.
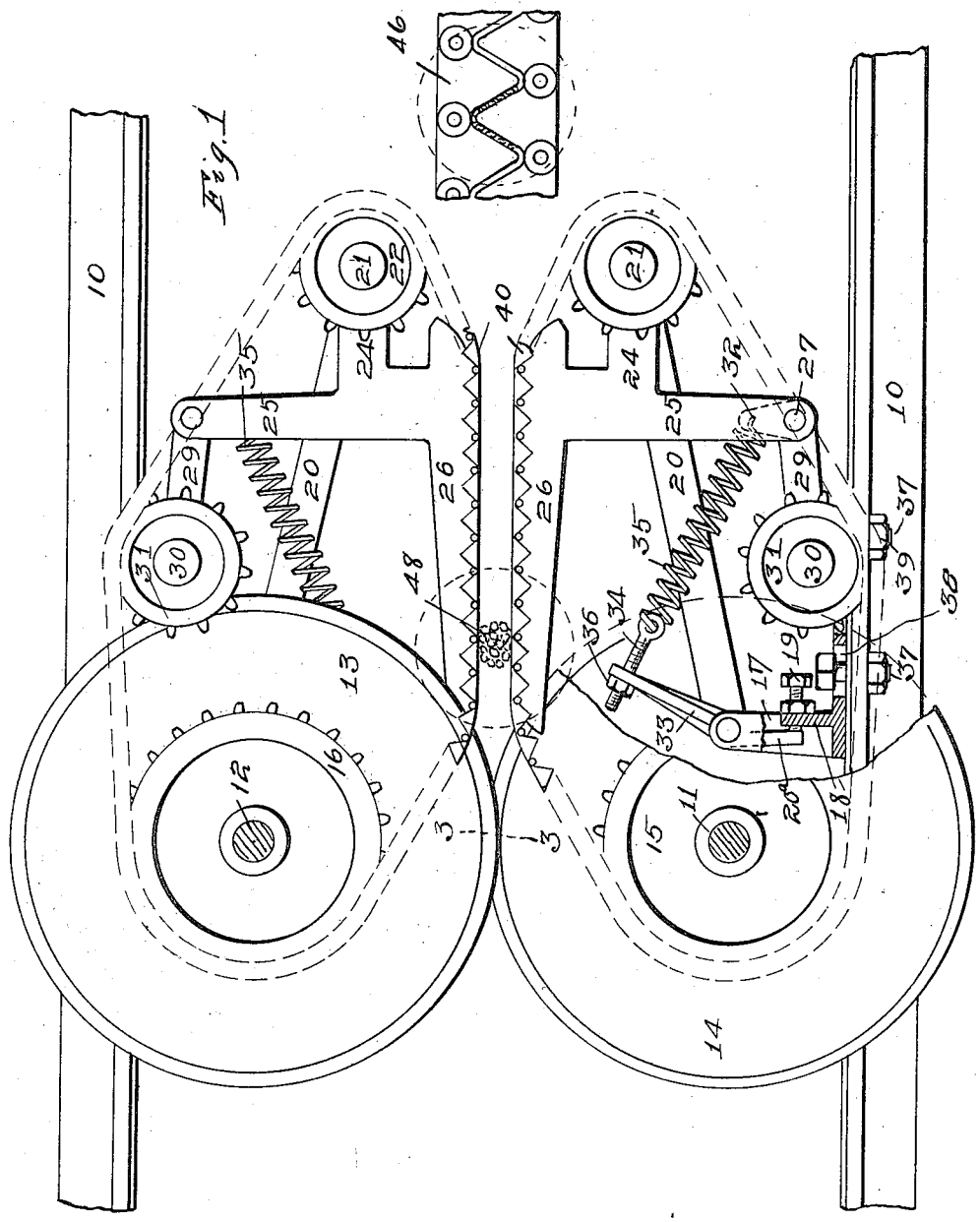

F. PRIOR.
BEET HARVESTING MACHINE.
APPLICATION FILED NOV. 20, 1916.
1,281,066.
Patented Oct. 8, 1918.
2 SHEETS—SHEET 2.
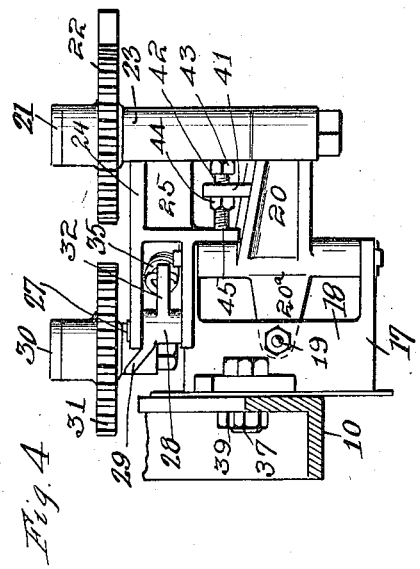
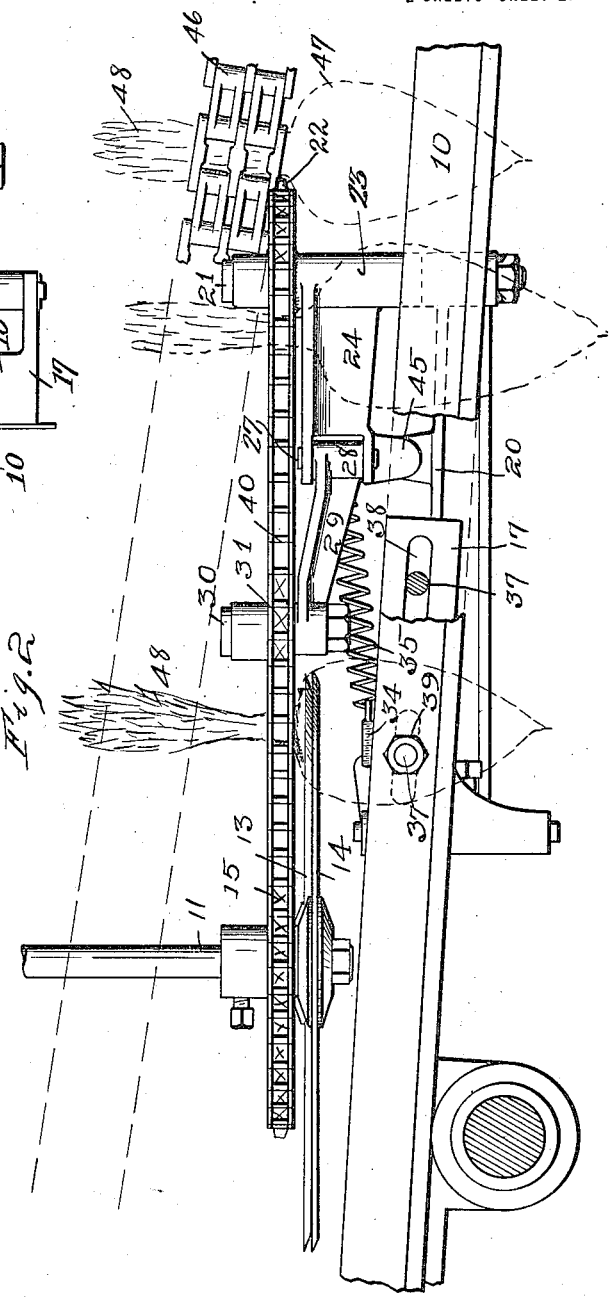

UNITED STATES PATENT OFFICE.

FRED PRIOR, OF DES MOINES, IOWA.

BEET-HARVESTING MACHINE.

1,281,066.  Specification of Letters Patent.  Patented Oct. 8, 1918.

Application filed November 20, 1916. Serial No. 132,377.

*To all whom it may concern:*

Be it known that I, FRED PRIOR, a citizen of the United States, and resident of Des Moines, in the county of Polk and State of Iowa, have invented a certain new and useful Beet-Harvesting Machine, of which the following is a specification.

The object of my invention is to provide a beet harvesting machine adapted for use with beets or other vegetables having a vegetable cutting or topping mechanism of simple, durable and inexpensive construction.

A further object is to provide such a machine having a beet topping or cutting mechanism so arranged as to cut all the vegetables at substantially the same distance below the tops thereof.

Still a further object is to provide such a mechanism adapted to receive and handle vegetables having foliage of different thicknesses.

My invention consists in the construction, arrangement and combination of the various parts of the device whereby the objects contemplated are attained, as hereinafter more fully set forth, pointed out in my claims, and illustrated in the accompanying drawings, in which:

Figure 1 shows a top or plan view partly in section of my improved mechanism for cutting the tops from beets or the like.

Fig. 2 shows a side elevation, parts being broken away.

Fig. 3 shows a detail, sectional view taken on the line 3—3 of Fig. 1, and

Fig. 4 shows a detail, sectional view of part of the mechanism.

In the accompanying drawings, I have used the reference numeral 10 to indicate generally the frame of the machine.

Mounted on the frame of the machine are two spaced upright shafts 11 and 12. On the shafts 11 and 12 are two rotary circular cutting knives 14 and 13, having their edges overlapping each other between the shafts, as shown in Fig. 3.

On the shafts 11 and 12 above the knives 14 and 13, are sprocket wheels 15 and 16. Extending inwardly from the side frame members 10 are opposite brackets 17, shown in Fig. 1. The brackets 17 have flanges 18 in which are mounted screw-threaded bolts 19 for a purpose hereinafter set forth.

Pivoted to the inner ends of the brackets 17 are arms 20 bent forwardly and inwardly in the machine.

Mounted in the forward end of each arm 20 is an upright shaft 21. On the upper end of each upright shaft 21 is rotatably mounted a sprocket gear 22. Each sprocket 22 is fixed on a sleeve 23 rotatably mounted on the shaft 21.

Fixed on and extending rearwardly in the machine from each sleeve 23 is an arm 24, at the rear end of which is a transverse arm 25 extending outwardly in the machine also inwardly in the machine from the arm 24.

On the inner end of the arm 25 is a shoe 26 extending longitudinally in the machine, the greater part of the length of the shoe 26 being rearward of the arm 25.

At the outer end of each arm 25 is a short upright shaft 27 on which is mounted a sleeve 28, shown in Figs. 2 and 4.

Extending rearwardly from each sleeve 28 is an arm 29 having at its free end a shaft 30 on which is mounted a sprocket gear 31.

Extending inwardly in the machine from each sleeve 28 is a short arm 32, one of said arms being shown in dotted lines in Fig. 1.

Each of the brackets 17 has at its inner end an inwardly extending arm 33. Extended through a suitable opening in the inner end of each arm 33 is an eye-bolt 34.

Secured to the eye-bolts 34 and to the respective arms 32 is a detachable coil spring 35. On one end of each eye-bolt 34 is a nut 36. By varying the position of the nut 36 on the eye-bolt 34 the tension of the spring 35 may be regulated.

In this connection it may be mentioned that the brackets 17 are adjustably mounted on the side frame members 10, by means of bolts 37 extended through openings in the frame members 10 and through horizontally elongated openings 38 in the brackets 17. The bolts 37 carry nuts 39 and the brackets 17 may be adjusted longitudinally with relation to the frame members 10 by loosening the nuts 39 and sliding the brackets 17 on the bolts 37.

On each side of the machine there is a chain 40 extending around the sprocket 15 or 16, a sprocket 31, a sprocket 22 and a shoe 26. The mechanism hereinbefore described mounted on the respective brackets 17 is duplicated on opposite sides of the machine.

It will be seen from the foregoing description that the spring 35 tends to draw the arm 32 toward the arm 33 and to thereby swing the sprocket 31 outwardly against the outer stretch of the chain 40 for tightening the chain. The spring 35 also tends to swing the shaft 27 and the arms 25 and 24, and the shaft 21 inwardly in the machine. This inward springing movement of the arm is limited by means of the bolts 19 hereinbefore described, which engage outwardly extending arms 20ª on the arms 20, and by adjustment of said bolts 19 the inward movement of the arm 20 and the parts carried thereby may be limited and determined.

It will be noted that the tension of the spring 35 not only tends to swing the arm 20 and all the mechanism supported thereby inwardly in the machine, but also tends to swing the arms 24 and 25 and the shoe 26 carried by the arm 25 inwardly in the machine with relation to the arm 20.

The inward movement of the arm 25 with relation to the arm 20 is limited in the following manner.

On each arm 20 is an upwardly extending lug 41 in which is mounted a screw-threaded bolt 42, having the head 43 on one side of the lug 20 and a nut 44 on the other side thereof.

On the arm 25 is a downwardly extending lug 45, adapted to be engaged by the end of the screw-threaded bolt 42 for limiting the inward swinging movement of the arm 25, with relation to the arm 20 (Fig. 4).

The limit of said inward swinging movement may be regulated and varied by adjusting the nut 44 on the bolt 42 and by adjusting said bolt 42 in the lug 41.

The mechanism forming the subject matter of this invention is designed to be used in connection with a beet harvesting machine of the general type disclosed in my previous application for patent, Serial Number 32,786, filed June 7, 1915. My cut-off mechanism is designed to be used with endless carriers 46 arranged to carry vegetables such as beets 47, shown by dotted lines in Fig. 2, or the like, upwardly and rearwardly. Usually for convenience sake the endless carriers 46 are arranged to travel in an inclined plane as illustrated by dotted lines in Fig. 2. It should be mentioned in this connection that the chains 40 are arranged in a horizontal plane, as clearly shown in said Fig. 2. It will be noted that the tops 48 of the beets are gripped by the endless carrier 46 for carrying the beets upwardly and rearwardly in the machine.

Some beet bodies will be nearer the endless carrier 46 than others. In all cases, however, when the beets reach the chains 40 they tend to pass just below said chains 40 with their tops 48 engaged by the endless carriers 46 and also by the chains 40. The beet bodies cannot pass upwardly between the chains 40 and yet on account of the fact that the chains 46 move upwardly in the machine as well as longitudinally thereof, the bodies of the beets will all be drawn up against the chains 40 before the beets reach the cutting knives. Thus it will be obvious that when the beets finally reach the edges of the cutting knives, they will all be cut off at approximately the same distance from the top of the beets.

One of the most important advantages of my mechanism for handling the beets at the time they are cut off, arises from the adjustability and flexibility of the parts. This adjustability is automatic. It will be noted that the arms 20 and all of the mechanism carried thereby will be swung toward each other by the tension of the spring 35 and that the arms 25 and the shoes 26 carried thereby are also permitted such limited swinging movement with relation to the arms 20. Thus the entire mechanism for holding the beets and guiding them in their movement toward the knives may be adjusted for handling beets of different widths, and the shoes 26 may also be adjusted with relation to the other parts of the mechanism.

This is very important, on account of the fact that the foliage at the tops of the beets varies very greatly, in thickness. Where beets of uniformly heavy foliage are being moved through the machine, the entire gripping devices may be sprung apart slightly for accommodating themselves to the beets. If, however, they vary considerably in thickness of their foliage, it will be obvious that the heavy leaved beet would force the forward end of the shoes apart, and at the same time there would be a tendency for the rearward end of said shoes to be moved toward each other, so that they would continue to grip small beets. When the heavy leaved beets reach the rear end of the shoes 26, the rear ends of said shoes will automatically press apart against the spring pressure and at the same time the forward ends of said shoes will tend to be moved together for gripping the smaller beets that might be fed to the shoes at the time the heavy leaved beets were held against the rear end of the shoe.

It will be noted that the edges of the knives 14 overlap, as shown in Fig. 3 and said edges are beveled.

Applicant has tried a variety of manners of beveling the edges of the cutting knives and has found that far the best results are secured by arranging the knives with the overlapping edge of one knife adjacent to a beveled edge of the other knife, as shown in Fig. 3 so that if a pebble or the like should be caught between the knives it would be adjacent to the beveled face of one knife, and if the knives should chance to be jarred apart, the sharp edge of the upper knife, for instance, would simply strike the lower edge of the beveled knife and slide back to proper position.

It will be understood that some changes may be made in the construction and arrangement of the parts of my improved beet harvester without departing from its essential features and purposes, and it is my intention to cover by this application any such changes which may be included within the scope of my claims:

I claim as my invention:

1. In a device of the class described, a frame, a pair of rotatable knives mounted thereon, with their adjacent edges overlapping each other in parallel planes, a pair of movable devices adapted to move toward and from each other, a pair of endless members for forming a conveyer for advancing vegetables to said devices, a pair of endless members arranged to travel over the respective movable devices for gripping and moving vegetables toward said knives.

2. In a device of the class described, a frame, a vegetable cutting device mounted thereon, and means for carrying vegetables to said cutting device, said means comprising a pair of endless carrier mechanisms, one end of each of said pair of endless carrier mechanisms being mounted on a swinging arm for permitting the adjacent stretches of the endless carrier mechanism to be moved toward or from each other.

3. In a device of the class described, a frame, a vegetable cutting device mounted thereon, means for carrying vegetables to said cutting device, said means comprising a pair of endless carrier mechanisms swinging arms, one end of each of said pair of endless conveyers being mounted on one of said swinging arms for permitting the adjacent stretches of said pair to be moved toward or from each other, shoes pivotally supported on said swinging arms and adapted to engage the outer surfaces of the inner stretches of said endless carrier mechanisms, and yielding means for moving said arms toward each other.

4. In a device of the class described, a frame, a vegetable cutting device mounted thereon, means for carrying vegetables to said cutting device, said means comprising swinging arms, a pair of endless carrier mechanisms, one end of each of said pair of endless carrier mechanisms being mounted on one of said swinging arms for permitting the adjacent stretches of said pair to be moved toward or from each other, and shoes pivotally supported to engage the outer surfaces of the inner stretches of said pair of carrier mechanisms, and yielding means for moving said arms toward each other, and for moving said shoes toward each other, and inwardly with relation to said pivoted arms.

5. In a device of the class described, a frame, a vegetable cutting device mounted thereon, means for carrying vegetables to said cutting device, said means comprising swinging arms, a pair of endless carrier mechanisms, one end of each of said pair of endless carrier mechanisms being mounted on one of said swinging arms for permitting the adjacent stretches of said pair to be moved toward or from each other, a shoe pivotally supported on each of said swinging arms, and adapted to engage the outer surface of the inner stretch of one of said pairs, yielding means for moving said arms toward each other and for moving said shoes toward each other and inwardly with relation to said pivoted arms, and a chain tightening device for each of said pair of endless carrier mechanisms operatively connected with said yielding means.

6. In a device of the class described, a frame, an endless carrier mechanism for carrying and gripping vegetables by the foliage at their tops, and carrying them in the machine upwardly and rearwardly, a cutter mechanism, a pair of endless carriers arranged above said cutter mechanism for receiving vegetables carried by said endless carrier mechanism, said pair of endless carriers being arranged in a different plane from that in which said first carrier mechanism travels, and being arranged with one end of each member of the pair adjacent to said first carrier mechanism, whereby a vegetable being carried upwardly and rearwardly in the machine will be seized by said pair of endless carriers and during a portion of the travel of said vegetable, the first carrying mechanism will draw the body of the vegetable upwardly against the under surfaces of the inner stretches of said pair of endless carriers for causing vegetables to be drawn to the cutter mechanism with the upper ends of the bodies of the vegetables held in the same position with relation to the pair of endless carriers and the cutter mechanism.

7. In a device of the class described, a frame, a vegetable cutter mechanism mounted thereon, a carrier mechanism adapted to receive the foliage of the tops of vegetables for carrying said vegetables upwardly and rearwardly in the machine, and guide devices arranged in a different plane from that in which the endless carrier mechanism travels, and located above said cutter mechanism, said guide devices including endless carriers adapted to receive the foliage of vegetables being carried upwardly by said first endless carrier mechanism, whereby the vegetables will be drawn toward the cutter mechanism, and will be also drawn upwardly against said guide.

8. In a device of the class described, a frame, a vegetable cutter mechanism mounted thereon, a carrier mechanism adapted to receive the foliage of the tops of vegetables for carrying said vegetables upwardly and rearwardly in the machine, guide devices arranged in a different plane from that in which the endless carrier mechanism travels and located above said cutter mechanism, said guide devices including endless carriers adapted to receive the foliage of vegetables being carried upwardly by said first endless carrier mechanism, whereby the vegetables will be drawn toward the cutter mechanism, and will be also drawn upwardly against said guide, the endless carriers of said guide device being swingable toward and from each other.

9. In a device of the class described, a frame, a vegetable cutter mechanism mounted thereon, a carrier mechanism adapted to receive the foliage of the tops of vegetables for carrying said vegetables upwardly and rearwardly in the machine, guide devices arranged in a different plane from that in which the endless carrier mechanism travels and located above said cutter mechanism, said guide device including endless carriers adapted to receive the foliage of vegetables being carried upwardly by said first endless carrier mechanism, whereby the vegetables will be drawn toward the cutter mechanism, and will also be drawn upwardly against said guide, the endless carriers of said guide devices being swingable toward and from each other, and including movable shoes for engaging the outer surfaces of the inner stretches of the endless carriers of the guide devices, said shoes being pivoted to a yielding means for moving the inner stretches of the endless carriers of the guide devices toward each other.

10. In a device of the class described, a frame, a vegetable cutter mechanism mounted thereon, a carrier mechanism adapted to receive the foliage of the tops of vegetables for carrying said vegetables upwardly and rearwardly in the machine, guide devices arranged in a different plane from that in which the endless carrier mechanism travels and located above said cutter mechanism, said guide devices including endless carriers adapted to receive the foliage of vegetables being carried upwardly by said first endless carrier mechanism, whereby the vegetables will be drawn toward the cutter mechanism, and will also be drawn upwardly against said guide, the endless carriers of said guide device being swingable toward and from each other, and including movable shoes for engaging the outer surfaces of the inner stretches of the endless carriers of the guide devices for moving them toward each other, said shoes being pivoted to a yielding means for moving the inner stretches of the endless carriers of the guide devices toward each other, and for moving said shoes toward each other with relation to the other parts of the guides.

11. In a device of the class described, a frame, a vegetable cutting device mounted thereon, means for carrying vegetables to said cutting device, said means comprising an endless carrier mechanism for conveying said vegetables to said cutting device, swinging arms, a pair of endless conveyers one end of each of said pair of endless conveyers being mounted on a swinging arm for permitting the adjacent stretches of said pair to be moved toward or from each other, a shoe pivotally supported on each of said swinging arms, and adapted to engage the outer surface of the inner stretch of one of said pair of conveyers, yielding means for moving said shoes toward each other and inwardly with relation to said pivoted arms, a chain tightening device for each of said pair of endless conveyers operatively connected with said yielding means, and means for limiting the inner swinging movement of the shoes with relation to the movable arms.

Des Moines, Iowa, July 28, 1916.

FRED PRIOR.

Copies of this patent may be obtained for five cents each, by addressing the "Commissioner of Patents, Washington, D. C."